(12) United States Patent  (10) Patent No.: US 6,649,837 B2
Garvin  (45) Date of Patent: Nov. 18, 2003

(54) SWIVEL FIXTURE HANGER ASSEMBLY FOR HIGH BAY FIXTURES

(76) Inventor: Barton L. Garvin, Garvin Industries, 4939 W. Lake St., Chicago, IL (US) 60644

( * ) Notice: Subject to any disclaimer, the term of this patent is extended or adjusted under 35 U.S.C. 154(b) by 0 days.

(21) Appl. No.: 10/357,942

(22) Filed: Feb. 4, 2003

(65) Prior Publication Data

US 2003/0146013 A1 Aug. 7, 2003

Related U.S. Application Data

(63) Continuation-in-part of application No. 10/061,892, filed on Feb. 4, 2002.

(51) Int. Cl.⁷ ............................................. H02G 3/14
(52) U.S. Cl. ........................ 174/66; 174/67; 220/241; 220/242
(58) Field of Search ............... 174/66, 67; 220/241, 220/242; 439/139, 165

(56) References Cited

U.S. PATENT DOCUMENTS

| | | |
|---|---|---|
| 4,909,405 A | 3/1990 | Kerr, Jr. |
| 5,012,043 A | 4/1991 | Seymour |
| 5,606,147 A | 2/1997 | Deschamps et al. |
| 5,728,973 A | 3/1998 | Jorgensen |
| 5,762,223 A | 6/1998 | Kerr, Jr. |
| 5,883,331 A | 3/1999 | Reiker |
| 5,939,671 A | 8/1999 | Gretz |
| 6,057,778 A | 5/2000 | Davidson |
| 6,133,531 A * | 10/2000 | Hayduke et al. ............... 174/67 |
| 6,164,475 A | 12/2000 | Jorgensen |
| 6,281,439 B1 | 8/2001 | Reiker |
| 6,312,146 B1 | 11/2001 | Tognacci |
| 6,410,851 B1 * | 6/2002 | Lamar et al. .................. 174/67 |
| 6,519,208 B2 * | 2/2003 | DeVries ........................ 368/10 |

* cited by examiner

Primary Examiner—Dhiru R Patel
(74) Attorney, Agent, or Firm—Charles F. Meroni, Jr.; Meroni & Meroni, P.C.

(57) ABSTRACT

A swivel fixture hanger assembly having a conduit box, a conduit box cover, and a swivel connector. The cover has a stationary cover section and a moveable cover section shaped to mate with the stationary cover section providing a seat for a swivel connector and coacting to define a central opening. A rigid strap pivotally connected to the stationary cover section and fixedly connected to the moveable cover section pivots the moveable cover section into and out of engagement with the stationary cover section. A fastener fastens a second end of the strap to the stationary cover section when the moveable cover section is engaged with the stationary cover section. The swivel connector has a seatable portion shaped to engage the seat of the cover and a connector portion extending through the central opening of the cover.

14 Claims, 5 Drawing Sheets

SWIVEL FIXTURE HANGER ASSEMBLY FOR HIGH BAY FIXTURES

PRIOR HISTORY

This is a Continuation in Part Patent Application of Non-Provisional patent application Ser. No. 10/061,892 filed Feb. 4, 2002.

BACKGROUND OF THE INVENTION

1. Field of the Invention

The present invention generally relates to electrical housings. More specifically, the present invention relates to swivel fixture hanger assemblies.

2. Description of the Prior Art

The use of swivel fixture hanger assemblies to hang heavy lighting fixtures and ceiling fans in buildings having high ceilings is well known. These types of assemblies are common in factories and warehouses where the lighting fixtures or fans are hung from a long shaft so that the lighting fixtures or fans are sufficiently close to the floor to be effective. The prior art swivel fixture hanger assemblies are usually constructed of an electrical conduit box covered by a single piece conduit box cover having a central dish shaped seat portion and opening wherein a swivel connector is seated. The swivel connector is rotateable within the seat portion and has a threaded fitting portion extending through the opening of the seat. An illustration of such a prior art assembly is shown in FIG. 8. A partial perforation of the central dish shaped seat portion is used to retain the swivel connector within the seat of the conduit box cover. A lighting fixture or fan is then connected to the connector via a shaft of predetermined length.

Installation of lighting fixtures or ceiling fans with this type of swivel fixture hanger assembly typically require two persons to install. One person typically holds the light fixture connected to a shaft that is in turn connected to the swivel connector having the conduit box cover loosely draped around the swivel connector. As the person holds the light fixture so that the mounting holes of the conduit box cover 35 are near the mounting holes in the conduit box, the second person matches up the mounting holes and secures the conduit box cover to the conduit box by screwing the two together. This process is time consuming and expensive because it requires the time and coordination of two persons. Accordingly, there is a need for a swivel fixture hanging assembly that can be installed by one person, saving time and money.

There are several prior art United States Patents issued disclosing several different types of conduit boxes and conduit box covers. The following United States Patents were uncovered in a search of prior art United States Patents.

U.S. Pat. No. 5,012,043 issued to Seymour discloses an adjustable outlet box assembly and method of application including an outlet box assembly with a box cover assembly mounted thereon and having a laterally extended receptacle box member to which is attached a variable depth ring assembly. This piece of prior art shows a single piece conduit box cover having additional structure for varying the depth of an outlet.

U.S. Pat. No. 5,606,147 issued to Deschamps et al. discloses an outlet box for mounting a fixture, such as a fan or a light, from a ceiling. Adjustable hanger screw mountings permit the mounting of a wide variety of fixtures to the box. Adjustability is attained by attaching the hanger screw mountings to the ends of a mounting arm which is pivotally connected to a top plate of the outlet box. This piece of prior art discloses the idea of a pivotally moveable arm in connection with a conduit box. However, this piece of prior art does not apply the use of a pivotally moveable arm to a conduit box cover that is shown in FIGS. 1 and 2.

U.S. Pat. No. 5,728,973 issued to Jorgensen discloses a knockout arrangement for an electrical junction box. FIG. 6 of this piece of prior art shows a single piece conduit box cover to be used with a conduit box.

U.S. Pat. No. 5,762,223 issued to Kerr, Jr. discloses an electrical box for a ceiling fan support capable of supporting a relatively heavy load from the underside of a joist/beam at an installation site. FIGS. 3, 9, 10 and 15 show the use of a swivel fixture connector.

U.S. Pat. No. 5,883,331 issued to Reiker discloses an electrical device mounting assembly including a box having a top wall and a side wall extending downwardly therefrom for defining a junction box cavity therein. An adhesive, such as a piece of double-sided tape, may be provided on the top wall of the junction box. The adhesive assists in the installation of the junction box by adhering the junction box to a support surface for a sufficiently long period of time so that the user may have both hands free for holding fasteners and attaching the fasteners to the support and, thus, supporting the junction box. This piece of prior art teaches the use of adhesive to temporarily hold electrical conduit assemblies, allowing installers to permanently secure a electrical conduit assembly with both hands.

U.S. Pat. No. 5,939,671 issued to Gretz discloses a ceiling mounting assembly for holding electrical devices in place on a joist that includes an electrical box having a base of three planar surfaces, each planar surface at a different depth, a first fastener device for temporarily securing the electrical box in place, a ceiling medallion for covering the electrical box, a second fastener device for temporarily securing the ceiling medallion to the electrical box, and a fixation device for securely fastening the electriccal box and the ceiling bezel to the joist. This piece of prior art shows a single piece conduit box cover.

U.S. Pat. No. 6,057,778 issued to Davidson discloses a family of covers having identical indented base regions for receiving a plurality of diverse alarm indicating and/or condition-sensing modules thereon. The alarm indicating modules each have a common "footprint" for being snugly received into the indented base region of each cover. This piece of prior art shows several different types of conduit box covers of one piece construction.

U.S. Pat. No. 6,164,475 issued to Jorgensen discloses an electrical box for mounting a ceiling fan or a light fixture in which the electrical box is the sole support for the fan or fixture. A cover can be mounted directly to the electrical box. The cover can be the attaching element between the electrical box and the fan or fixture. This piece of prior art shows a conduit box cover of single piece construction in FIG. 6.

SUMMARY OF THE INVENTION

To solve some of the problems associated with the prior art, an improved swivel fixture hanger assembly is provided.

An object of the claimed invention is to provide a swivel fixture hanger assembly that allows the installation of a lighting fixture or fan using a swivel fixture by one person.

Another object of the claimed invention is to provide a bifurcated conduit box cover connected to a conduit box allowing an installer to pivot a moveable cover portion to gain access to the interior of the conduit box.

The claimed invention comprises a swivel fixture hanger assembly having a conduit box, a conduit box cover, and a swivel connector. The conduit box cover has a stationary cover section and a moveable cover section shaped to mate with the stationary cover section.

The conduit box cover provides a seat for a swivel connector wherein the stationary cover section and the moveable cover section co-act to define a central opening. A rigid strap pivotally connected to the stationary cover section and fixedly connected to the moveable cover section pivots the moveable cover section into and out of engagement with the stationary cover section. The stationary cover section has a cutaway portion adjacent the pivot point of the rigid member allowing the moveable cover section to pivot into and out of engagement with the stationary cover section. A fastener fastens a second end of the rigid strap to the stationary cover section when the moveable cover section is engaged with the stationary cover section.

The swivel connector has a seatable swivel portion shaped to engage the seat of the conduit box cover and a connector portion extending through the central opening of the cover having a set of male threads within a cavity.

A further embodiment of the claimed invention provides a two part conduit box cover for ball and socket type connector assemblies that is bifurcated into a moveable cover section as a second part and a stationary cover section as a first part. The stationary first part has more than half of the socket portion of the ball and socket type connection enabling a ball type connector assembly to hang unassisted within the stationary first part during installation of the ball and socket type connection. The moveable second part has less than half of the socket portion of the ball and socket type connection and is pivotally connected directly to the stationary first part about a pivot point of the stationary first part. The moveable second part is pivotable into and out of engagement with the stationary first part so that a ball type connector assembly can be place within the stationary first part when the moveable second part is pivoted out of engagement with the stationary first part. The moveable second part can then be pivoted into engagement with the stationary first part, fully capturing the ball type connector assembly within the bifurcated conduit box cover.

BRIEF DESCRIPTION OF THE DRAWINGS

FIG. 1 shows a perspective view of the assembly

FIG. 2 shows a top view of the conduit box cover attached to an electrical conduit box.

FIG. 3 shows how the assembly is installed.

FIG. 4 shows a side view of the assembly.

FIG. 5 shows a top view of the swivel connector.

FIG. 6 shows a side view of the swivel connector.

FIG. 7 shows a bottom view of the conduit box cover

FIG. 8 shows a top view of the prior art conduit box cover.

FIG. 9 shows a top view of another embodiment of the bifurcated conduit box cover where the moveable cover section is is pivoted out of engagement with the stationary cover section.

FIG. 10 shows a side view of FIG. 9.

DETAILED DESCRIPTION OF THE PREFERRED EMBODIMENT

Figure 1:
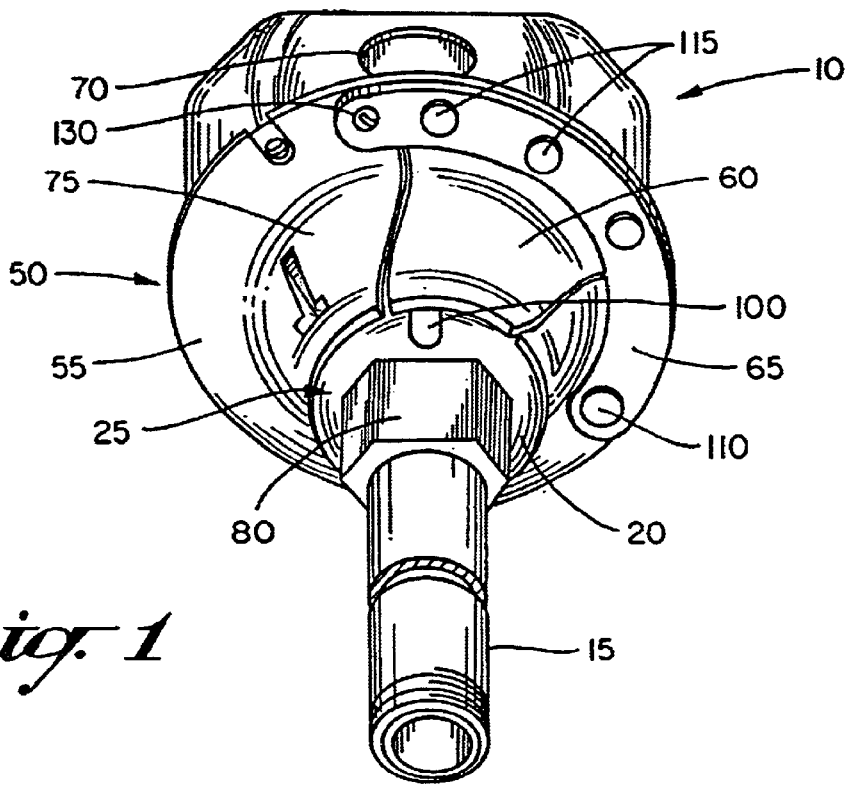
FIG. 1.

Turning now to the drawings, FIGS. 1–4 show the swivel fixture hanger assembly 10. Swivel fixture hanger assemblies 10 of this type are generally used in buildings, such as factories and warehouses, where high ceilings are common. Lighting fixtures and ceiling fans are typically hung from a shaft 15 connected to the swivel connector 20 so that the lighting fixture or ceiling fan is sufficiently close to the floor to be effective for its intended use. Movements of these types of electrical fixtures while in service are compensated for by the swivel connection 25 of the assembly 10 allowing a short range of motion within the assembly 10. The swivel or ball and socket type connection 25 can compensate for the vibrations associated with the movements of a ceiling fan, provide a way to pivot an electrical fixture out of the way when an object requiring a larger amount of overhead clearance is needed to be moved by an electrical fixture, or compensate for movement of the structure supporting the assembly 10.

Figure 8:
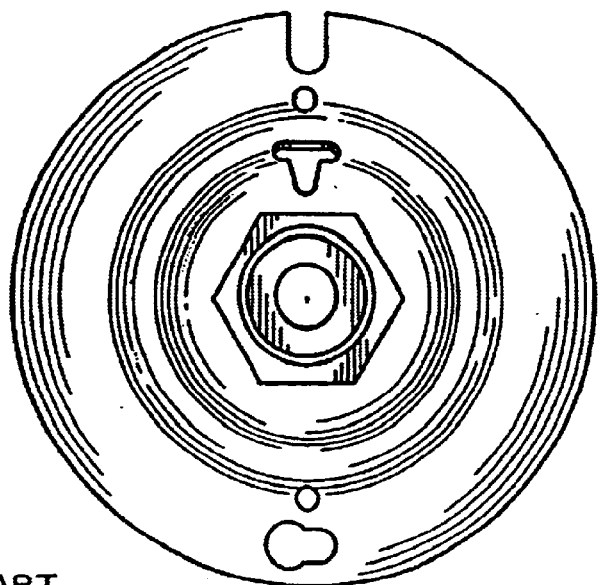
FIG. 8.

In the prior art, installation of electrical fixtures using a swivel fixture hanger assembly 10 required two persons working together to properly install the assembly 10. Due to the single piece construction of the prior art conduit box cover shown in FIG. 8, one installer would typically have to hold the electrical fixture connected to a shaft 15 that is in turn connected to the swivel connector 20 having the single piece conduit box cover loosely draped around the swivel connector 20 while the other installer would connect the electrical wiring of the electrical fixture to the wiring in the electrical conduit box. After the wiring was completed, the installer holding the electrical fixture would have to position the electrical fixture so that the mounting holes of the conduit box cover would be close to the mounting holes in the electrical conduit box 40. The second installer would have to match up the mounting holes of the conduit box cover with the mounting holes of the conduit box 40 and then secures the conduit box cover to the electrical conduit box 45 by screwing the two together.

The process of installing an assembly using the prior art conduit box cover is time consuming in that close coordination between the two installers would have to be developed, taking time to coordinate one installer's movements with the other installer's movements. This time consuming process translates into increased costs for installing an electrical fixture using a swivel fixture hanger assembly in that two installers are being paid to make a proper installation. The claimed invention provides an assembly 10 that decreases the amount of cost involved in installing a lighting fixture or ceiling fan using a swivel connector hanger assembly 10.

The claimed invention provides a swivel connector hanger assembly 10 as shown in FIG. 1 that can be installed by one person, saving time and money during the installation of an electrical fixture using a swivel fixture hanger assembly 10. The swivel connector hanger assembly 10 generally comprises an electrical conduit box 45, a conduit box cover 50 designed to accept a swivel connector 20 bifurcated into a stationary cover section 55 and a moveable cover section 60, a pivoting rigid strap 65 connecting the moveable cover section 60 to the stationary cover section 55, and a swivel connector 20.

The electrical conduit box 45 shown in FIGS. 1–4 is about 4" inches square and is made of galvanized steel. Electrical conduit boxes are commercially available and are manufactured by a number of companies in many different shapes and sizes, with the more common shapes being square or round. Electrical conduit boxes are typically secured to structural members of a ceiling or wall for the electrical wiring of a building. The knockouts 70 in the walls of the conduit box are provided for electrical installers to fit electrical conduit piping to the conduit box so that electrical wiring can be placed therein.

The conduit box cover 50 of the claimed invention shown in FIGS. 1–4 is designed to accept a swivel connector 20 and is generally sized and shaped to fit a conduit box 45. As previously mentioned, conduit boxes come in many different shapes and sizes to fit a particular application. Therefore the conduit box cover 50 of the claimed invention may be of many different sizes and shapes to fit various sizes and shapes of conduit boxes. The conduit box cover 50 shown in FIGS. 1–4 is approximately 4⅛" inches in diameter and is made of galvanized steel. The conduit box cover 50 is securable to the electrical conduit box 45 through mounting holes 35 near the edges of the conduit box cover 50. A dish shaped swivel connector seat 75 approximately 2½" inches in diameter is provided in the center of the conduit box cover 50. The swivel connector seat 75 is defined by a first arcuate portion 76 and a first lip 77 in the stationary cover section 55 and a second arcuate portion 78 and a second lip 79 in the moveable cover section 60. The swivel connector seat 75 has a central round opening about 1½" in diameter where the threaded connector portion 80 of a swivel connector 20 may hang through.

Figure 2:
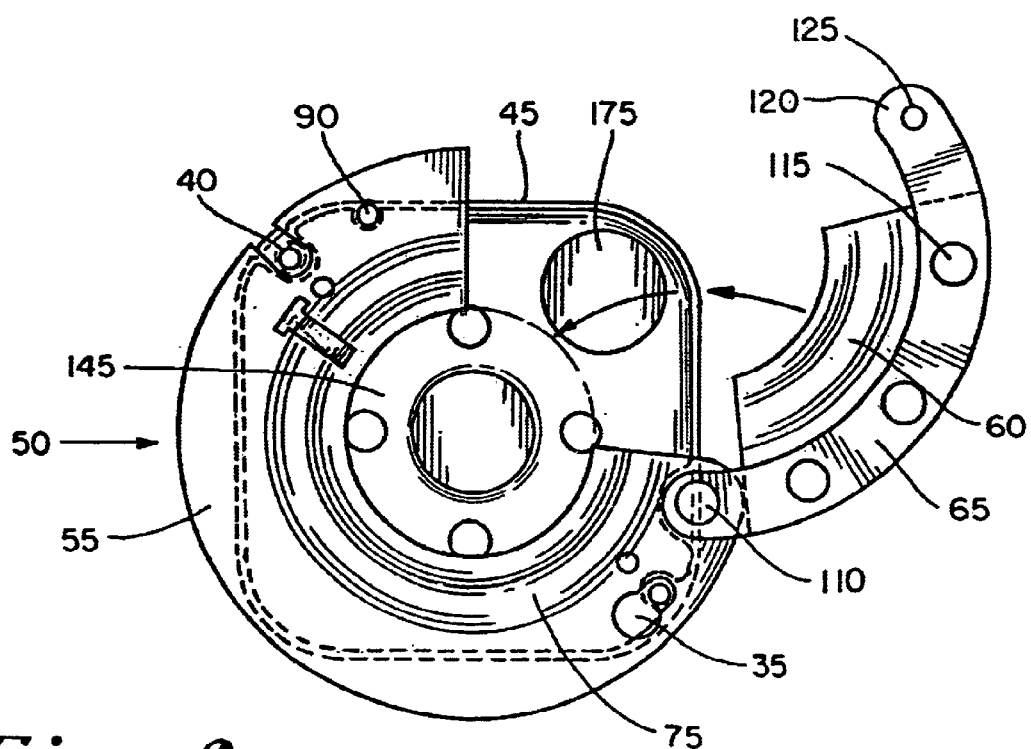
FIG. 2.

In a preferred embodiment of the invention, the conduit box cover 50 is divided into a stationary cover section 55 and a moveable cover section 60, as shown in FIG. 2, such that the stationary cover section 55 can solely support a swivel connector 20 having a lighting fixture or ceiling fan connected to it. This is accomplished by dividing the conduit box cover 50 such that the stationary cover section 55 has about 75% of the swivel connector seat structure 75, allowing the swivel connector 20 to sit in the swivel connector seat portion 85 of the stationary cover section 55. The division of the swivel connector seat 75 between the stationary cover section 55 and the moveable cover section 60 is generally governed by the amount of opening required in the swivel connector seat 75 to place the swivel connector 20 in the swivel connector seat 75 when the stationary cover section 55 is secured to the electrical conduit box 45. The moveable cover section 60 shown in FIG. 2 is has about 25% of the swivel connector seat structure 75.

The conduit box cover 50 is bifurcated such that the mounting holes 35 are located in the stationary cover section 55 so that the stationary cover section 55 is fixedly mounted to the conduit box before the swivel connector 20 is placed in the swivel connector seat 75 as shown in FIG. 2. In the preferred embodiment of the invention, there are two mounting holes for securing the conduit box cover 50 to the electrical conduit box 45, but more than two mounting holes 35 are contemplated within the scope of the claimed invention. The stationary cover section 55 also has a threaded aperture 90 so that the moveable cover section 60 can be secured in place by the rigid strap 65.

Figure 7:
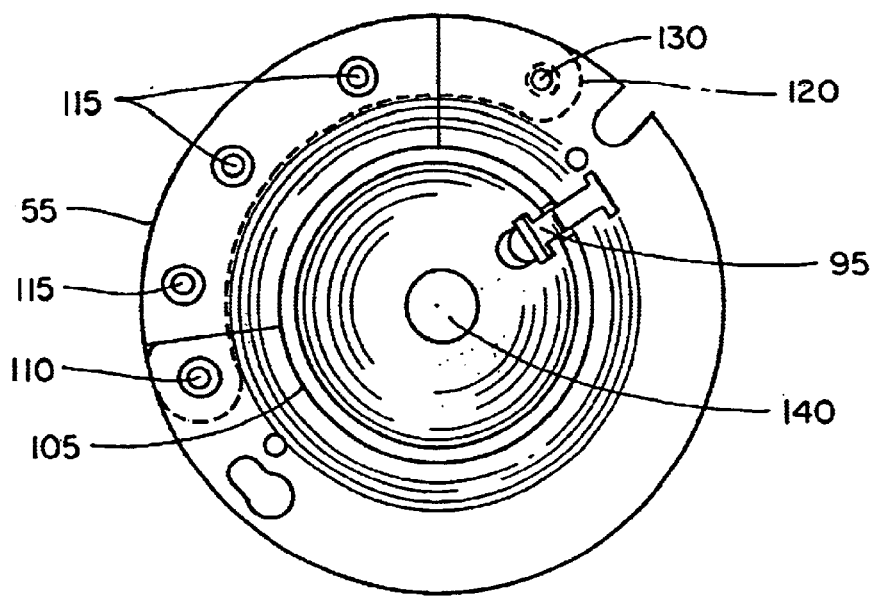
FIG. 7.

The conduit box cover 50 can be sold individually or in combination with a swivel connector 20. A partial perforation 95 in the curved side wall of the swivel connector seat 75, as shown in FIG. 7, can be used to retain the swivel connector 20 within the seat 75 during transportation and installation of the swivel connector hanger assembly 10. The retention of the swivel connector 20 is accomplished by the partial perforation 95 engaging a slot 100 in the swivel portion 105 of a swivel connector 20 so that a swivel connector 20 may be retained in the seat 75 of the conduit box cover 50.

The swivel connector assembly 10 shown in FIGS. 1–4 show a preferred embodiment of the invention where the conduit box cover 50 has one moveable cover section 60 sized and shaped to cover the remaining portion of the electrical conduit box 45. In other embodiments of the invention there may be more than one moveable cover section 60. The moveable cover section 60 completes the conduit box cover 50 and is sized and shaped to engaged the stationary cover section 55 of the conduit box cover 50.

FIGS. 1 and 2 show the rigid strap 65 of the claimed invention. The rigid strap 65 is made of galvanized steel and is generally C shaped to wrap around the swivel connector seat 75 of the conduit box cover 50. The rigid strap 65 is pivotally connected to the stationary cover section 55 of the conduit box cover 50 by a rivet 110, however other types of fasteners capable of providing a pivotal connection are contemplated. The rigid strap 65 is fixedly connected to the moveable cover section 60 by a plurality of rivets 115 or some other type of fastener capable of providing a low cost fixed connection. The terminal end 120 of the rigid strap 65 has an aperture 125 for fixedly connecting the rigid strap 65 in place to the stationary cover section 55 with a screw 130 after the swivel connector 20 has been placed in the swivel connector seat 75 and the moveable cover section 60 has been pivoted into engagement with the stationary cover section 55.

Figure 3:
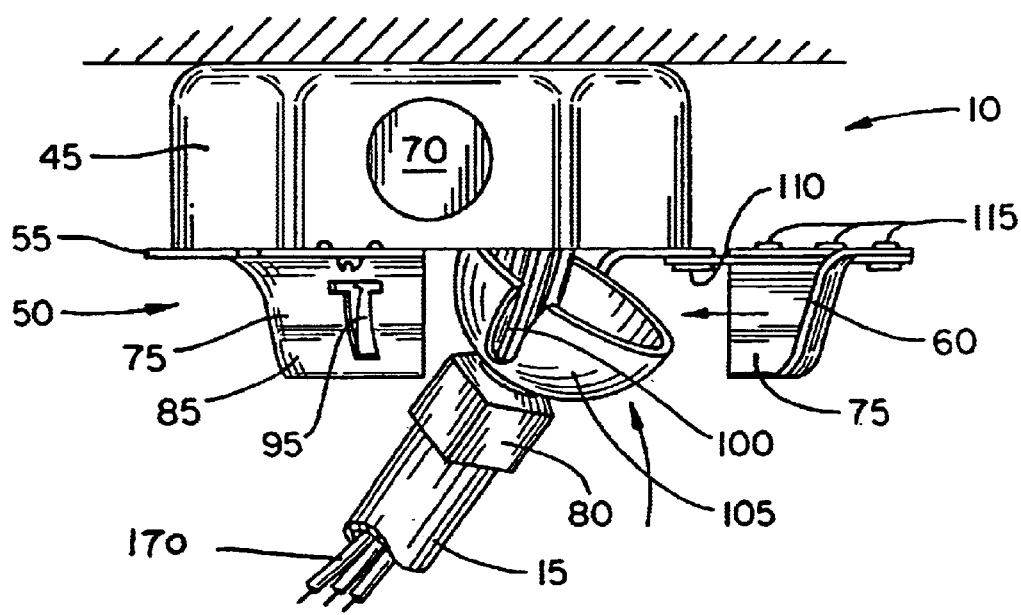
FIG. 3.
Figure 4:
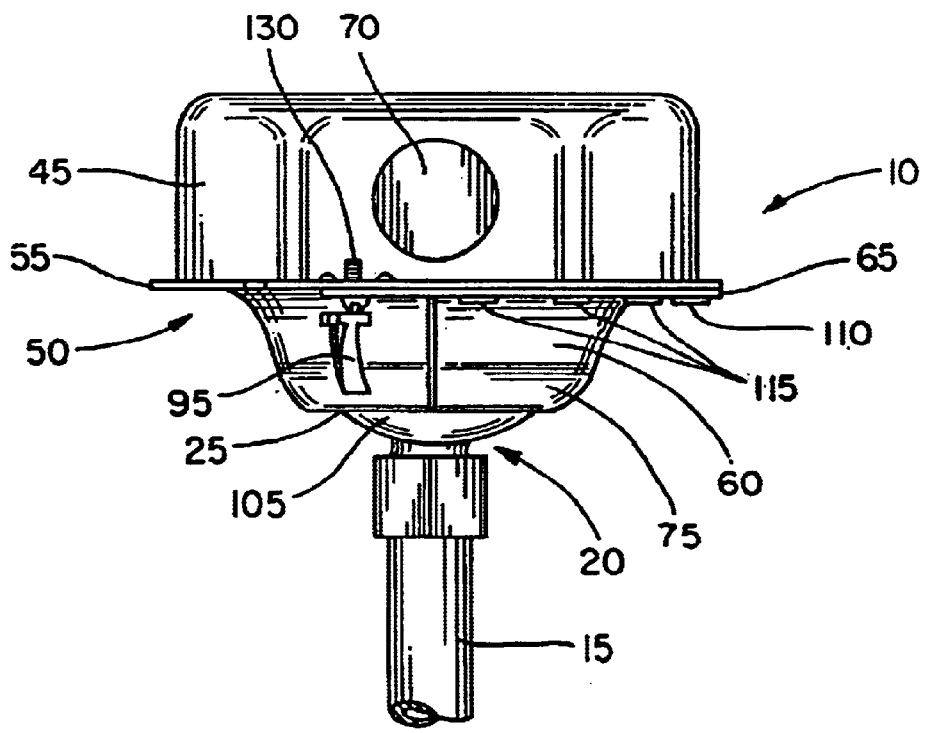
FIG. 4.
Figure 5:
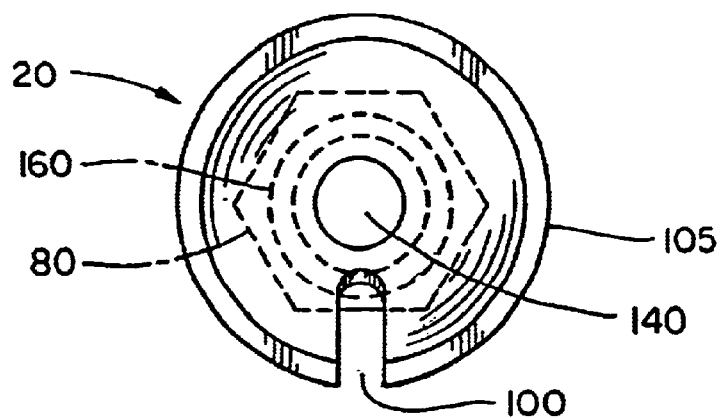
FIG. 5.
Figure 6:
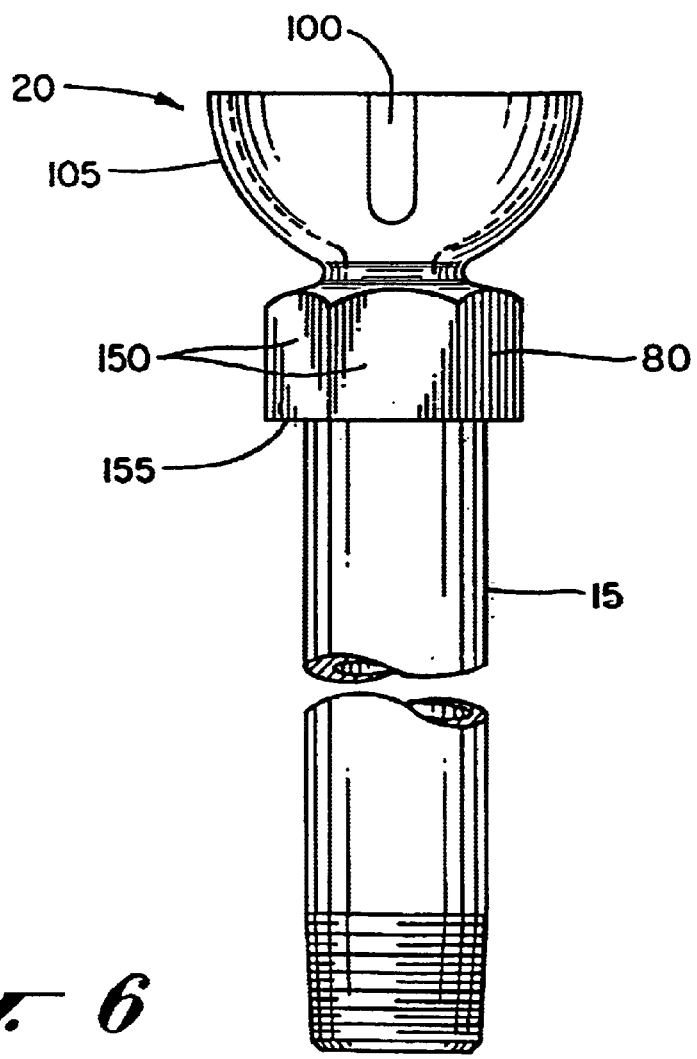
FIG. 6.

The swivel connector 20 is sized and shaped to fit in the swivel connector seat 75 having a hollow hemispherical swivel portion 105 and a connector portion 80 as shown in FIG. 3. The swivel portion 105 has a slotted opening 135 to receive the partial perforation 95 and a central round hole 140 to allow an electrical fixture's wiring to be connected to the wiring of the electrical conduit box 45 through the swivel connector 20. The connector portion 80 of the swivel connector 20 is generally sized to fit through the round hole 145 in the swivel connector seat 75 and has several exterior flat faces 150 to allow an installer to grip the connector portion with a pair of pliers. The interior cavity 155 of the connector portion 80 has a set of female threads for connecting an electrical fixture directly to the swivel connector 20 or by way of a shaft 15 connected to the electrical fixture. The swivel connector's central round hole 140 is centered within the bottom wall 165 of the interior cavity 155 as shown in FIG. 5.

The swivel connector hanger assembly 10 is generally installed by first fixedly mounting the electrical conduit box 45 to a structural component of a ceiling or wall. After the electrical conduit box 45 has been properly connected including the connection of conduit piping and wiring as desired in the particular application, the conduit box cover 50 is secured to the electrical conduit box 45 with the moveable cover section 60 pivoted away from the stationary cover section 55 and the swivel connector 20 removed as shown in FIG. 2. The swivel connector 20 is then attached to the electrical fixture having the electrical fixture wiring 170 extending through the hole of the swivel connector 20 as shown in FIG. 3. The electrical fixture is then hung by the swivel connector 20 in the swivel connector seat 75 so that the electrical fixture's wiring 170 can be connected to the wiring in the electrical conduit box 45. The conduit box cover 50 being sectioned such that the electrical fixture can be hung in place by the stationary cover section 55 while still allowing the installer access to the interior 175 of the electrical conduit box 45 allows a single installer to install an electrical fixture, eliminating the necessity of a second installer holding the electrical fixture while the wiring is completed.

Figure 9:
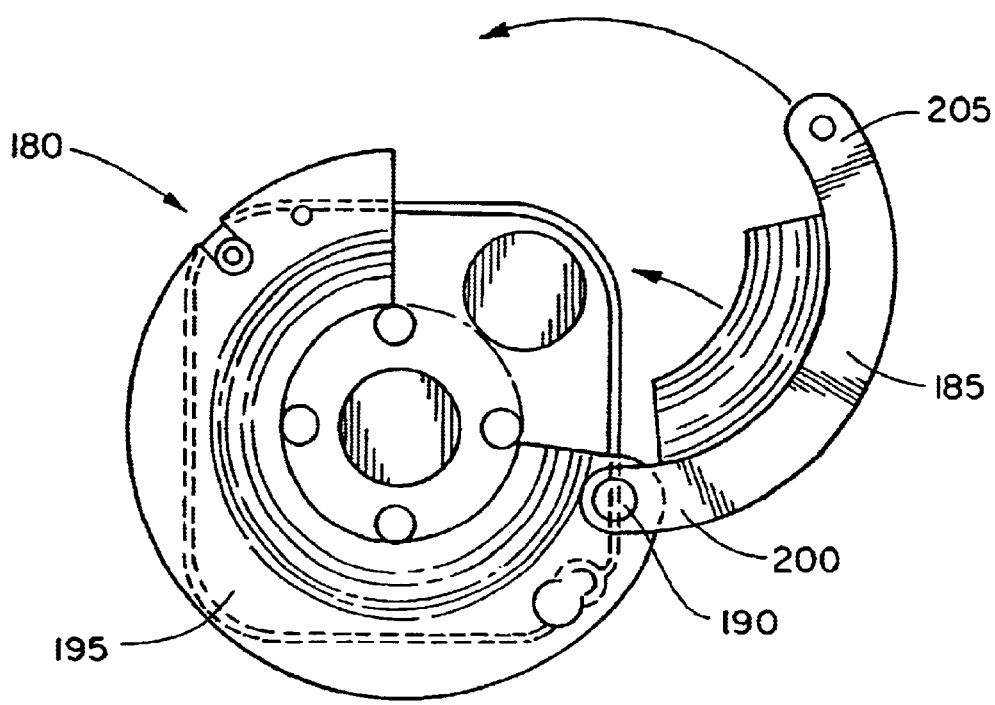
FIG. 9.
Figure 10:
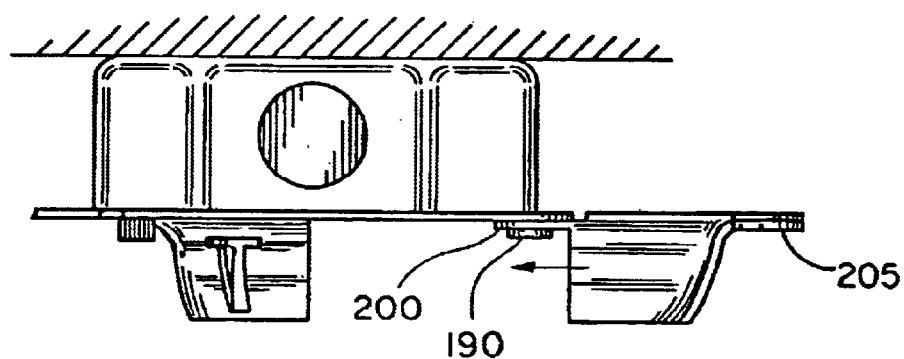
FIG. 10.

FIGS. 9 and 10 show another embodiment of the bifurcated conduit box cover 180 made of two parts, where the moveable second part 185 has a pivotal connection 190 made directly to the stationary first part 195. The moveable second part 185 has an elevated portion 200 about the pivotal connection 190 of the moveable second part 185 to the stationary first part 195 so that the portion of the moveable second part 185 overlapping the stationary first part 195 does not interfere with the pivoting action of the moveable second part 185 with respect to the stationary first part 195. A second elevated portion 205 overlaps the stationary first part 195 so that the moveable second part 185 can be securely fastened to the stationary first part 195. This embodiment of the claimed invention eliminates the need for the rigid strap 65, thus reducing manufacturing costs.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A ball and socket fixture connector conduit box cover, the cover comprising:
    a stationary cover section having more than half of a socket portion in a ball and socket connection; and
    a moveable cover section having less than half of the socket portion in a ball and said socket connection pivotally connected to the stationary cover section pivoting about a pivot point of the stationary cover section, the moveable cover section having an elevated portion at least partially about the pivotal connection overlapping a portion of the stationary cover section, the elevated portion providing clearance for movement of the moveable cover section in relation to the stationary cover section.

2. The cover of claim 1 further comprising a cutaway portion adjacent the pivot point of the stationary cover section allowing the moveable cover section to pivot into and out of engagement with the stationary cover section.

3. The cover of claim 2 further comprising at least one fastening means for fastening the moveable cover section in engaged relation with the stationary cover section.

4. The cover of claim 3 further comprising a partial perforation in the socket portion of the stationary cover section to retain the ball in the ball and socket connection.

5. The cover of claim 4 wherein the moveable cover section is pivotally connected to the stationary cover section by a rigid strap fixedly connected to the moveable cover section.

6. The cover of claim 5 wherein the pivotal connection of the moveable cover section and the stationary cover section is a rivet.

7. A ball and socket fixture hanger assembly, the assembly comprising:
    a stationary cover section having more than half of a socket portion in a ball and socket connection; and
    a moveable cover section having less than half of the socket portion in a ball and said socket connection pivotally connected to the stationary cover section pivoting about
    a pivot point of the stationary cover section, the moveable cover section pivoting into and out of engagement with the stationary cover section;
        an elevated portion at least partially about the pivotal connection overlapping a portion of the stationary cover section, the elevated portion providing clearance for movement of the moveable cover section in relation to the stationary cover section;
        at least one fastening means for fastening the moveable cover section in engaged relation with the stationary cover section;
        at least one connector having a ball portion sized and shaped to engage the socket portion of the stationary cover section and the moveable cover section.

8. The assembly of claim 7 wherein the stationary cover section has a cutaway portion adjacent the pivot point.

9. The cover of claim 8 wherein the moveable cover section is pivotally connected to the stationary cover section by a rivet.

10. The cover of claim 9 further comprising a partial perforation in the socket portion of the stationary cover section to engage an opening in a ball type connector, the partial perforation retaining the ball type connector adjacent the socket portion of the stationary cover section.

11. A two part conduit box cover having a dish shaped seat for receiving a swivel fixture bifurcated into a stationary first Dart and moveable second part, the moveable second part section pivotally connected to the stationary first part to pivot into and out of engagement with the stationary first part, moveable second part having an elevated portion adjacent the pivot connection overlapping a portion of the stationary first part providing clearance for movement of the moveable second part in relation to the stationary first part.

12. The cover of claim 11 wherein the stationary first part has a cutaway portion adjacent the pivot connection allowing the moveable second part to pivot into and out of engagement with the stationary first part.

13. The cover of claim 12 further comprising at least one fastening means for fastening the moveable second part in engaged relation with the stationary first part.

14. The cover of claim 13 further comprising a partial perforation in the dish shaped seat to engage an opening in a swivel type connector, the partial perforation retaining a swivel type connector adjacent the dish shaped seat.

* * * * *